United States Patent
Kim et al.

(10) Patent No.: US 9,389,776 B2
(45) Date of Patent: Jul. 12, 2016

(54) SWITCHING COMPLEX, FLEXIBLE DISPLAY APPARATUS HAVING THE SAME AND METHOD OF GENERATING INPUT SIGNAL USING THE SAME

(71) Applicant: Samsung Display Co., Ltd., Yongin (KR)

(72) Inventors: Yong-Il Kim, Yongin (KR); Chang-Yong Jeong, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 280 days.

(21) Appl. No.: 13/931,662

(22) Filed: Jun. 28, 2013

(65) Prior Publication Data

US 2014/0176457 A1    Jun. 26, 2014

(30) Foreign Application Priority Data

Dec. 20, 2012 (KR) ........................ 10-2012-0149175

(51) Int. Cl.
*G06F 3/041* (2006.01)
*G06F 3/0488* (2013.01)

(52) U.S. Cl.
CPC ............ *G06F 3/0488* (2013.01); *G06F 3/0416* (2013.01); *G06F 2203/04102* (2013.01); *G06F 2203/04808* (2013.01)

(58) Field of Classification Search
CPC ... G06F 3/0418; G06F 3/0488; G06F 3/0416; G06F 2203/04808; G06F 2203/04102; G06F 3/041
USPC ........................................................ 345/173
See application file for complete search history.

(56) References Cited

U.S. PATENT DOCUMENTS

| | | | |
|---|---|---|---|
| 2003/0227441 A1* | 12/2003 | Hioki et al. | 345/156 |
| 2007/0247422 A1 | 10/2007 | Vertegaal et al. | |
| 2010/0045705 A1 | 2/2010 | Vertegaal et al. | |
| 2010/0141605 A1 | 6/2010 | Kang et al. | |
| 2010/0171708 A1 | 7/2010 | Chuang | |
| 2011/0310038 A1* | 12/2011 | Park et al. | 345/173 |
| 2012/0112994 A1 | 5/2012 | Vertegaal et al. | |

FOREIGN PATENT DOCUMENTS

| | | |
|---|---|---|
| KR | 10-2010-0065418 A | 6/2010 |
| KR | 10-2010-0082286 A | 7/2010 |
| KR | 10-2012-0093148 A | 8/2012 |

* cited by examiner

*Primary Examiner* — Gustavo Polo
(74) *Attorney, Agent, or Firm* — Knobbe, Martens, Olson & Bear LLP

(57) ABSTRACT

A switching complex including first and second switches is disclosed. The first switch is formed on a display part of the overall display so as to generate a first switching signal based on a grip position. The second switch is formed on a corner of the display part to generate a second switching signal based on bending of the corner of the display part while the first switching signal is generated. Therefore, input is simplified, and switching errors are reduced.

18 Claims, 9 Drawing Sheets

SWITCHING COMPLEX, FLEXIBLE DISPLAY APPARATUS HAVING THE SAME AND METHOD OF GENERATING INPUT SIGNAL USING THE SAME

CROSS-REFERENCE TO RELATED APPLICATIONS

This application claims priority under 35 USC §119 to Korean Patent Applications No. 10-2012-0149175, filed on Dec. 20, 2012 in the Korean Intellectual Property Office (KIPO), the contents of which are incorporated herein in its entirety by reference.

BACKGROUND

1. Field

The disclosed technology relates generally to a switching complex, a flexible display apparatus having the switching complex and a method of generating an input signal using the switching complex. More particularly, certain aspects of the disclosed technology relate to a switching complex capable of being easily inputted, a flexible display apparatus having the switching complex and a method of generating an input signal using the switching complex.

2. Description of the Related Technology

Because of flat panel displays' various desirable characteristics such as low power consumption, small thickness, small size, etc., flat panel displays are been widely used in various fields. A typical flat panel display apparatus includes a thin panel, a circuit applying a signal to the panel, a module, a case, etc.

Some flat panel display apparatuses include flexible display panels that can be bent. Display panels capable of being bent are more resistant to external impact, which can improve yield and portability.

However, input area of many portable flat panel display apparatuses are small, making them prone to mistyping a key pad or a touch screen by the user. In particular, when a main operation such as on/off, mode change, start/end of an application, etc., is mistyped, the operation may not execute as intended by the user.

In order to overcome the above-mentioned problems, various input elements have been tried for use in flat panel display apparatuses. However, when a sensing element is added, manufacturing cost increases, and in addition, a compensating process may be required to compensate minor sensing errors. Thus, it is undesirable to use additional input elements in flat panel display apparatuses.

SUMMARY OF CERTAIN INVENTIVE ASPECTS

Some example embodiments provide a switching complex capable of being easily inputted.

Some example embodiments additionally provide a flexible display apparatus having the switching complex.

Some example embodiments additionally provide a method of generating an input signal using the switching complex.

According to some example embodiments, a switching complex includes a first switch and a second switch. The first switch is disposed on a display part to generate a first switching signal based on a grip position. The second switch is disposed on a corner of the display part to generate a second switching signal based on a bending of a corner of the display part while the first switching signal is generated.

In example embodiments, the bent corner and the grip position may be alternatingly disposed.

In example embodiments, the first switching signal may include a digital signal.

In example embodiments, the switching complex may further include an input data generating part that generates input data based on first and second switching signals.

In example embodiments, the input data generating part may include a Look-Up-Table (LUT) in which an input signal corresponding to the first and second signals is stored.

According to some example embodiments, a flexible display apparatus includes a display part, a first switch, a second switch, an input signal generating part and a controlling part. The display part is configured to display an image and be bent in response to an external force. The first switch is disposed on the display part to generate a first switching signal based on a grip position. The second switch is disposed on a corner of the display part to generate a second switching signal based on the bending of the corner of the display part. The input signal generating part is configured to generate an input signal based on the first and second switching signals. The controlling part is configured to drive the display part based on the input signal.

In example embodiments, the second switching signal may be generated during the first switching signal is generated.

In example embodiments, the bent corner and the grip position may be alternatingly disposed.

In example embodiments, the display part may include a plurality of divided regions and a plurality of corners, where each of the divided regions includes a first switching element. The second signal may sense the bending of the corner of the flexible display apparatus.

In example embodiments, the second signal may sense a plurality of bendings of one or more corners of the flexible display apparatus.

In example embodiments, the display part may include a plurality of divided regions and a plurality of corners, where each of the divided regions includes a first switching element. The second signal may sense multiple occurrences of the bending of one of the plurality the corners of the flexible display apparatus.

In example embodiments, the second switching signal may sense multiple occurrences of the bending of the corner.

In example embodiments, the first switching signal may include a digital signal.

In example embodiments, the flexible display apparatus may further include an input data generating part that generates input data based on the first and second switching signals.

In example embodiments, the flexible display apparatus may further include a touch switch generating a touch signal based on a touch of a user.

In example embodiments, the first switch may further include a touch member integrally formed with the touch switch.

According to some example embodiments, in a method of generating an input signal using a flexible display apparatus, the flexible display apparatus includes a first switch, a second switch and an input signal generating part. The first switch is disposed on a display part to generate a first switching signal based on a grip position. The second switch is disposed on a corner of the display part to generate a second switching signal based on bending of the corner. The input signal generating part generates an input signal based on the first and second switching signals. The method is provided as follows. The first switching signal is generated using the first switch when a finger of a user grips the flexible display apparatus. The first switching signal is detected using the input signal generating part. A second switching signal is generated using the second switch when the corner of the flexible display apparatus is bent. The second switching signal is detected using the input signal generating part. The input signal corresponding to the first and second switching signals is generated using the input signal generating part, when the second switching signal is detected during the first switching signal is detected.

In example embodiments, the second switching signal may be generated by bending the corner multiple times.

In example embodiments, the second switching signal may be generated by bending a plurality of corners.

According to some example embodiments, in a method of generating an input signal using a flexible display apparatus, the flexible display apparatus includes a sensing part, a second switch and an input signal generating part. The sensing part is disposed on a display part to generate a sensing signal based on a touch of a user. The second switch is disposed on a corner of the display part to generate a second switching signal based on bending of the corner. The input signal generating part generates an input signal based on the sensing signal and the second switching signal. The method is provided as follows. The touch is sensed using the sensing part to generate the sensing signal. The sensing signal is detected using the input signal generating part. A second switching signal is generated using the second switch when the corner of the flexible display apparatus is bent. The second switching signal is detected using the input signal generating part. The sensing signal is set as a first switching signal. The input signal corresponding to the first and second switching signals is generated using the input signal generating part.

Therefore, only the presence of a bend is detected to generate the input signal, such that a differentiation of the degree of bending is not necessary. Thus, a compensating process can be omitted, which can lead to a reduction in detection error. Also, the presence of a bend can be detected using a simple sensor, which can lead to a reduction in manufacturing cost.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF CERTAIN INVENTIVE EMBODIMENTS

Figure 1:
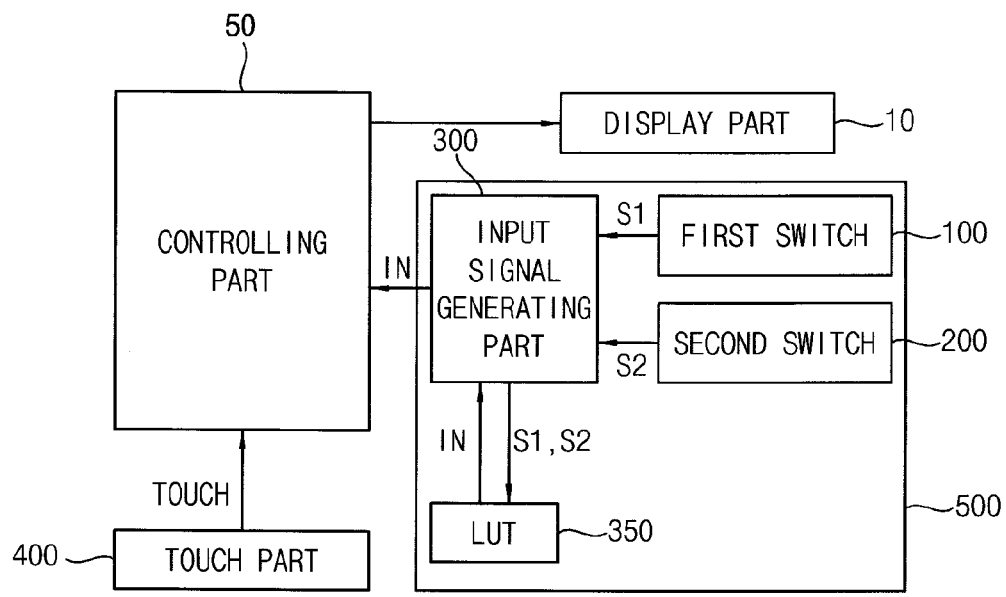
FIG. 1 is a block diagram illustrating a flexible display apparatus according to one example embodiment of the present invention.

Various example embodiments will be described more fully hereinafter with reference to the accompanying drawings, in which some example embodiments are shown. The disclosed technology may, however, be embodied in many different forms and should not be construed as being limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
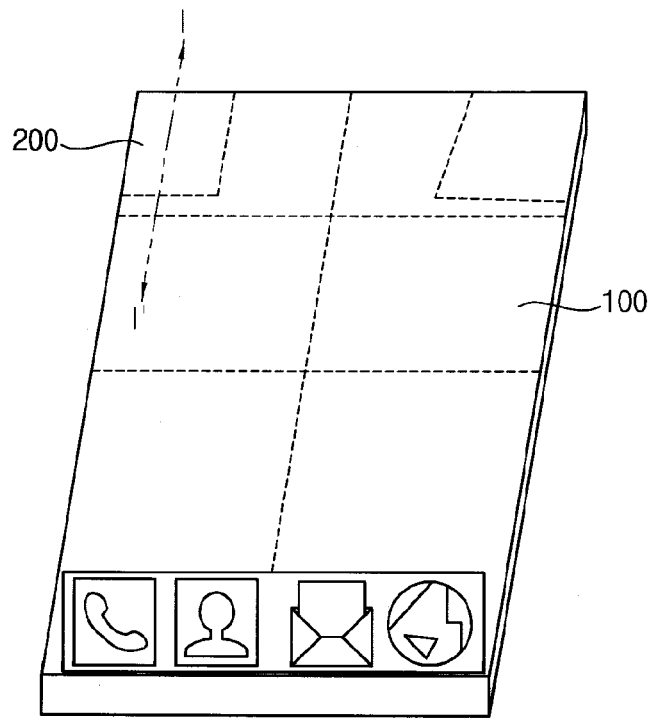
FIG. 2 is a perspective view illustrating the flexible display apparatus of FIG. 1.
Figure 3:
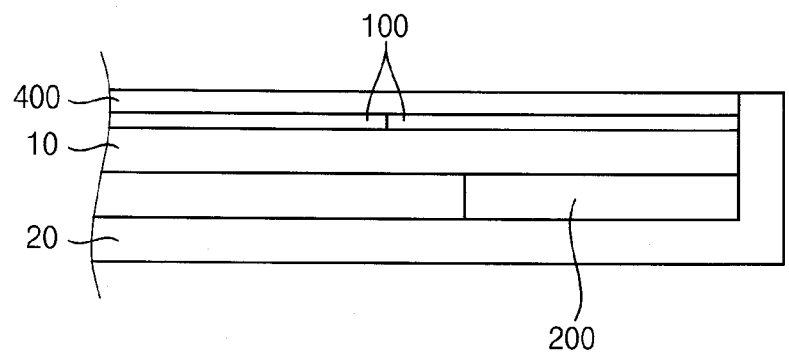
FIG. 3 is a cross-sectional view of the flexible display apparatus of FIG. 2 taken along a cross-section I-I'.

FIG. 1 is a block diagram illustrating a flexible display apparatus according to one example embodiment of the present invention. FIG. 2 is a perspective view illustrating the flexible display apparatus of FIG. 1. FIG. 3 is a cross-sectional view of the flexible display apparatus of FIG. 2 taken along a cross-section I-I' of FIG. 2.

Referring to FIGS. 1 to 3, the flexible display apparatus includes a display part 10, a case 20, a controlling part 50, a touch switch 400 and a switching complex 500.

The display part 10 displays an image. In one embodiment, the display part 10 includes a flexible display panel. In another embodiment, the display part 10 includes a rigid flat display panel.

The controlling part 50 applies an image signal to the display part 10 based on an input signal IN, a touch signal TOUCH and image data (not shown).

The touch switch 400 converts a mechanical touch into the touch signal TOUCH, which is an electrical signal. In one embodiment, the touch switch 400 includes a touch sensor that can convert a changes in capacitance that may be caused by touch of a finger, a touch pen, etc., into an electrical signal. In another embodiment, the touch switch may convert a pressure change, a current change, a light change, etc., into the electrical signal.

The switching complex 500 includes a first switch 100, a second switch 200, an input signal generating part 300 and a memory 350.

The first switch 100 generates a first switching signal S1 based on a grip and a grip position, when a user grips the flexible display apparatus. For example, the first switch 100 includes a pressure sensor that changes a grip pressure on the flexible display apparatus into an electric signal. Alternatively, the first switch may include a touch sensor.

The second switch 200 is disposed on a corner of the flexible display apparatus to generate a second switching signal S2 based on a bend and a bending position, when the user bends the corner of the display apparatus. For example, the second switch 200 includes a tension sensor that changes a tension generated by bending the corner of the flexible display apparatus into an electric signal. For example, the second switch 200 may include an optical fiber to generate the electric signal based on a bending of the optical fiber.

Alternatively, the second switch 200 may include a contact switch. For example, two electrodes may make contact with each other when the corner is not bent, and the electrodes may be spaced apart from each other when the corner is bent, thereby generating the electric signal.

The input signal generating part 300 generates an input signal IN based on the first and second switching signals S1 and S2. For example, the input signal generating part 300 reads the input signal IN corresponding to a combination of the and second switching signals S1 and S2 from the memory 350. For example, the memory 350 may include a Look-Up-Table (LUT).

In the present embodiment, the first and second switching signals S1 and S2 include digital signals. When the first and second switching signals S1 and S2 include the digital signals, the errors of gripping degree, the bending degree, etc., may be decreased, and a compensating process for an analog sensing signal may be omitted. Thus, yield may be increased. Alternatively, the first and second switching signals may include analog signals.

When the user grips a portion of the flexible display apparatus by one hand and bends the corner of the flexible display apparatus by the other hand, the first and second switches 100 and 200 generate the first and second switching signals S1 and S2, respectively.

The first and second switching signals S1 and S2 are inputted to the input signal generating part 300. The input signal generating part 300 compares the first and second switching signals S1 and S2 with the data stored in the memory 350 to generate the input signal IN.

The input signal IN is outputted from the input signal generating part 300 to be applied to the controlling part 50.

The controlling part 50 applies an operation signal corresponding to the input signal IN to the display part 10.

Therefore, an operation corresponding to the grip position and the bending of the corner is performed, and the display part 10 displays an image corresponding to the operation.

Referring to FIGS. 2 and 3, the display part 10, the controlling part 50, the touch switch 400 and the switching complex 500 are received in the case 20.

The case 20 includes a flexible material so that the case 20 may be bent by an externally provided force.

The second switch 200 is disposed on an inner surface of the case to sense the bend of a corner of the case 20. For example, the second switch 200 senses the presence of a bend of the corner of the case 20, and does not sense the bending degree of the corner.

The display part 10 is received in the case 20 in which the second switch 200 is disposed.

The first switch 100 is disposed on the display part 10. For example, the flexible display apparatus includes six first switches 100, and the first switches 100 are disposed on six divided regions of a screen, respectively.

The touch switch 400 is disposed on the first switch 100.

Figure 4:
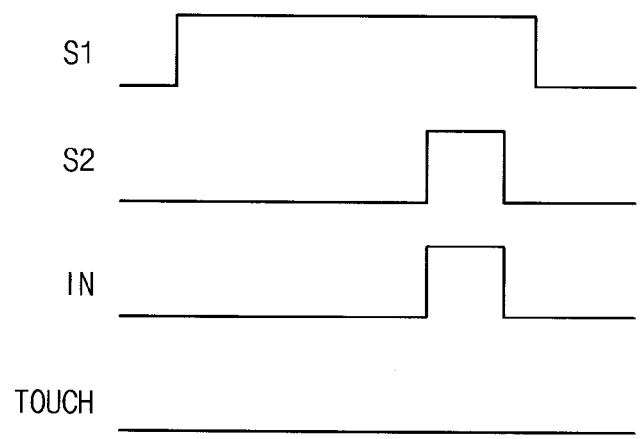
FIG. 4 is a timing diagram illustrating a method of generating an input signal according to one example embodiment of the present invention.

FIG. 4 is a timing diagram illustrating a method of generating an input signal according to one example embodiment of the present invention.

Referring to FIG. 4, the touch switch 400 does not generate the touch signal TOUCH while the first and second switches 100 and 200 generate the first and second switching signals S1 and S2, respectively.

Figure 5:
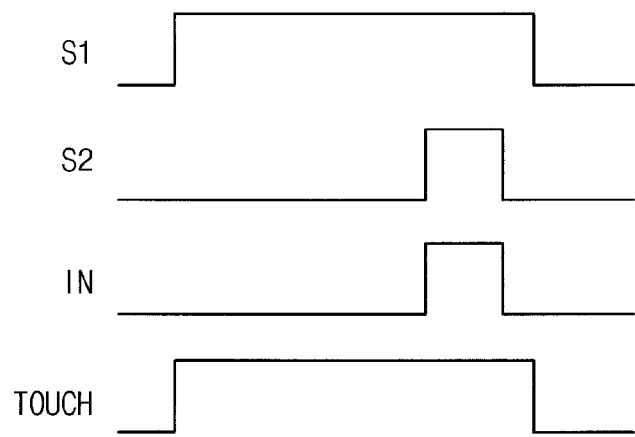
FIG. 5 is a timing diagram illustrating a method of generating an input signal according to another example embodiment of the present invention.

FIG. 5 is a timing diagram illustrating a method of generating an input signal according to another example embodiment of the present invention.

Referring to FIG. 5, a touch switch 400 may generate a touch signal TOUCH corresponding to a grip position while first and second switches 100 and 200 generate first and second switching signals S1 and S2. A controlling part 50 may compare the touch signal TOUCH and the input signal IN, and may set priority on the second switching signal S2 by the gripping not to perform the operation of the touch signal TOUCH, when the touch position is substantially the same as the grip position.

Figure 6:
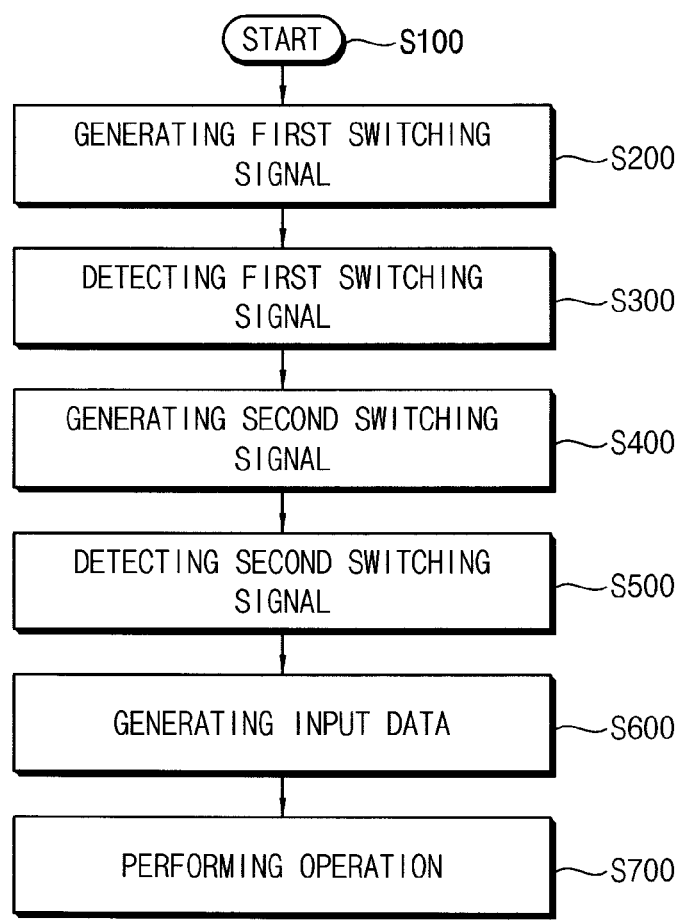
FIG. 6 is a flow chart illustrating a method of generating an input signal according to another example embodiment of the present invention.

FIG. 6 is a flow chart illustrating a method of generating an input signal according to still another example embodiment of the present invention.

Referring to FIGS. 1 and 6, in the method of generating the input signal, a flexible display apparatus including a first switch 100, a second switch 200 and an input signal generating part 300 is provided (step S100). The first switch 100 is disposed on a display part 10 to generate a first switching signal S1 based on a grip position. The second switch 200 is disposed on a corner of the display part 10 to generate a second switching signal S2 based on the bend of the corner.

The input signal generating part 300 generates an input data IN based on the first and second switching signals S1 and S2.

When fingers of a user grips the flexible display apparatus having the display part 10, the first switching signal S1 is generated using the first switch 100 (step S200).

The first switching signal S1 is detected using the input signal generating part 300 (step S300).

When the corner of the flexible display apparatus having the display part 10 is bent by the fingers of the user, the second switching signal S2 is generated using the second switch 200 (step S400).

The second switching signal S2 is detected using the input signal generating part 300 (step S500).

When the second switching signal S2 is detected while the first switching signal S1 is detected, an input signal IN corresponding to the first and second switching signals S1 and S2 is outputted using the input signal generating part 300 (step S600). That is, the input signal IN is generated when the first and second switching signals S1 and S2 are simultaneously generated.

An operation corresponding to the input signal IN is performed at the display part 10.

According to the present example embodiment, the flexible display apparatus includes the first switch 100 sensing the grip position and the second switch 200 sensing the bending of the corner of the display part 10, so that various input signals may be generated. Also, error of the switching complex 500 is decreased, and compensating process may be omitted. Thus, yield of the flexible display apparatus may be increased.

Figure 7:
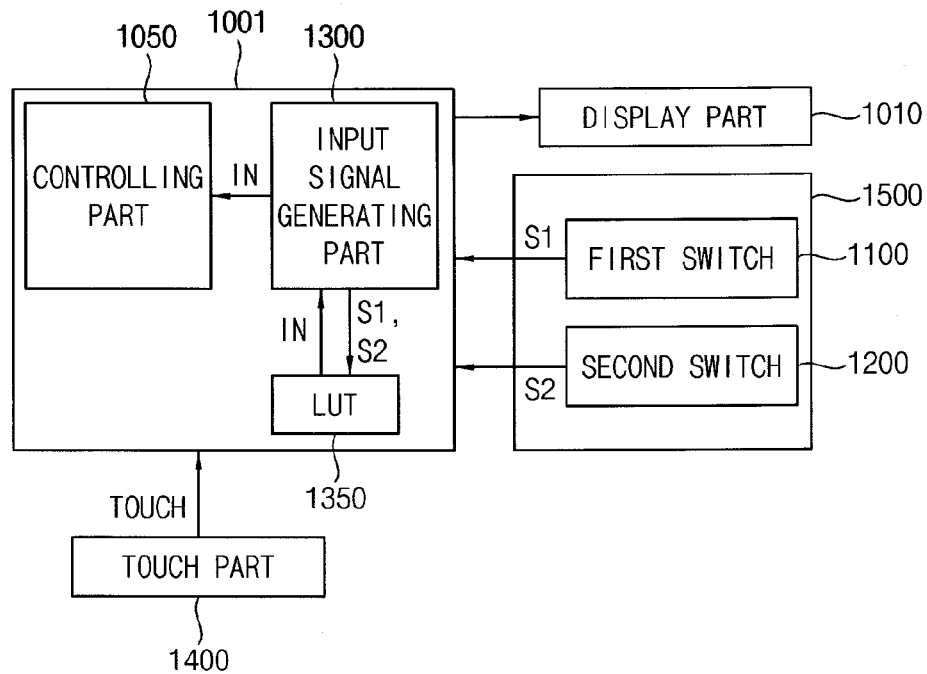
FIG. 7 is a block diagram illustrating a flexible display apparatus according to another example embodiment of the present invention.

FIG. 7 is a block diagram illustrating a flexible display apparatus according to further still another example embodiment of the present invention.

Referring to FIG. 7, the flexible display apparatus includes a display part 1010, a controlling member 1001, a touch switch 1400 and a switching complex 1500.

The display part 1010 displays an image, and includes a flexible display panel.

The switching complex 1500 includes a first switch 1100 and a second switch 1200.

The first switch 1100 senses a grip and a grip position to generate a first switching signal S1 when a user grip the flexible display apparatus.

The second switch 1200 is disposed on a corner of the flexible display apparatus to sense bend and a bend position to generate a second switching signal S2, when the user bends the corner of the flexible display apparatus.

The controlling member 1001 includes a controlling part 1050, an input signal generating part 1300 and a memory 1350.

The controlling part 1050 applies an image signal to the display part 1010 based on an input signal IN, a touch signal TOUCH and an image data (not shown).

The input signal generating part 1300 generates an input signal IN based on the first and second switching signals S1 and S2. For example, the input signal generating part 1300 reads the input signal IN corresponding to a combination of the first and second switching signals S1 and S2 from the memory 1350 to output the input signal IN. For example, the memory 1350 may include a Look-Up Table (LUT).

The input signal IN is outputted from the input signal generating part 1300 to the controlling part 1050.

The controlling part 1050 applies an operation signal corresponding to the input signal IN to the display part 1010.

The touch switch 1400 changes a mechanical touch into a touch signal that is an electrical signal.

Thus, the operation corresponding to the grip position and the bent corner is displayed on the display part 1010.

Referring again to FIG. 4, the touch switch 1400 does not generate a touch signal TOUCH while the first and second switches 1100 and 1200 generate the first and second switching signals S1 and S2, respectively.

Alternatively, referring again to FIG. 5, the touch switch 1400 may generate the touch signal TOUCH corresponding to the grip position while the first and second switches 1100 and 1200 generate the first and second switching signals S1 and S2, respectively.

According to the present example embodiment, the flexible display apparatus includes the first switch 1100 that senses the grip position and the second switch 1200 that senses the bending of the corner of the display part 1010, so that various input signals may be generated. Also, the error of the switching complex 1500 is decreased, and a compensation process may be omitted. Thus, yield of the flexible display apparatus may be increased.

Figure 8:
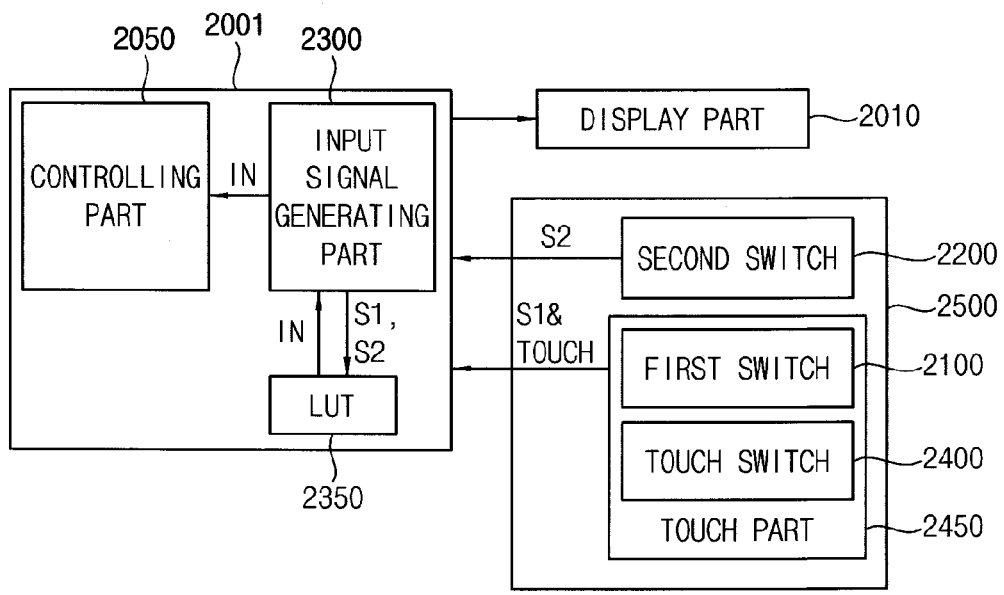
FIG. 8 is a block diagram illustrating a flexible display apparatus according to another example embodiment of the present invention.
Figure 9:
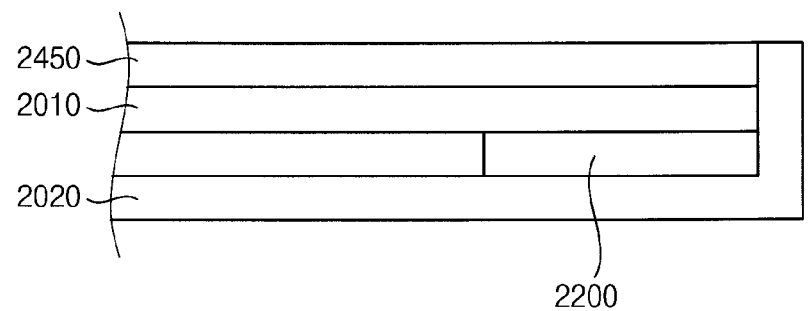
FIG. 9 is a cross-sectional view illustrating a flexible display apparatus of FIG. 8.

FIG. 8 is a block diagram illustrating a flexible display apparatus according to further still another example embodiment of the present invention. FIG. 9 is a cross-sectional view illustrating a flexible display apparatus of FIG. 7.

Referring to FIG. 8, the flexible display apparatus includes a display part 2010, a controlling member 2001 and a switching complex 2500.

The display part 2010 displays an image. For example, the display part 2010 may include a flexible display panel.

The switching complex 2500 includes a second switch 2200 and a touch part 2450.

The second switch 2200 is disposed on a corner of the flexible display apparatus to sense the presence of a bend and a bend position to generate a second switching signal S2, when the user bends the corner of the flexible display apparatus.

The touch part 2450 includes a first switch 2100 and a touch switch 2400, and changes a mechanical touch into a sensing signal S1&TOUCH that is an electrical signal. For example, the touch part 2450 includes a touch sensor, and changes a capacitance variation caused by a touch of a finger of a user, a touch pen, etc., into the electrical signal. Alternatively, the touch switch may change a pressure variation, a current variation, a photo variation caused by the touch into the electrical signal.

The first switch 2100 senses a grip and a grip position to generate a first switching signal S1 when the user grips the flexible display apparatus.

The touch switch 2400 senses a touch and a touch position to generate a touch signal TOUCH.

For example, the first switch 2100 and the touch switch 2400 are integrally formed with each other, and the signal generated from the touch part 2450 includes the sensing signal S1&TOUCH that is a mixture of the first switching signal S1 and the touch signal TOUCH.

The controlling member 2001 includes a controlling part 2050, an input signal generating part 2300 and a memory 2350.

The controlling part 2050 applies an image signal to the display part 2010 based on an input signal IN, a touch signal TOUCH and an image data (not shown).

The input signal generating part 2300 generates an input signal IN based on the second switching signal S2 and the sensing signal S1&TOUCH. The input signal generating part 2300 determines whether the second switching signal S2 and the sensing signal S1&TOUCH are simultaneously inputted. When the second switching signal S2 and the sensing signal S1&TOUCH are simultaneously inputted to the input signal generating part 2300, the sensing signal S1&TOUCH is set to be a first switching signal S1. However, when the second switching signal S2 and the sensing signal S1&TOUCH are not simultaneously inputted to the input signal generating part 2300, the sensing signal S1&TOUCH is set to be a touch signal TOUCH.

For example, the input signal generating part 2300 reads the input signal IN corresponding to a combination of the first and second switching signals S1 and S2 from the memory 2350 to output the input signal IN. For example, the memory 2350 may include a Look-Up Table (LUT).

For example, the sensing signal S1&TOUCH and the second switching signal S2 include a digital signal.

The input signal IN is outputted from the input signal generating part 2300 to the controlling part 2050.

The controlling part 2050 applies an operation signal corresponding to the input signal IN to the display part 2010.

Thus, the operation corresponding to the grip position and the bent corner is displayed on the display part 2010.

Referring to FIG. 9, the display part 2010, the controlling part 2001 (shown in FIG. 8), the touch part 2450 and the second switch 2200 are received in a case 2020.

The case 2020 may include a flexible material to be bent in response to an externally provided force.

The second switch 2200 is disposed on an inner surface of the case 2020 to sense the bending of the corner of the case 2020.

The display part 2010 is received in the case 2020 having the second switch 2200 mounted thereon.

The touch part 2450 is disposed on the display part 2010. For example, the touch part 2450 may be disposed on an entire of a front surface of the display part 2010.

Figure 10:
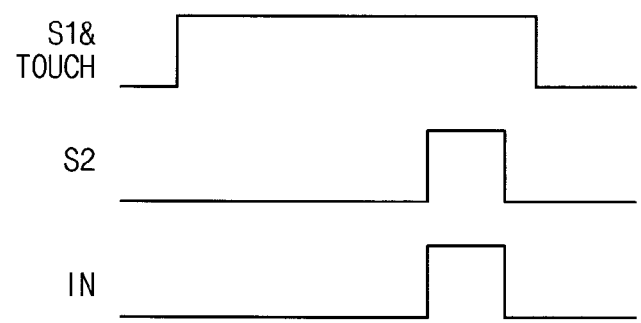
FIG. 10 is a timing diagram illustrating a method of generating an input signal according to another example embodiment of the present invention.

FIG. 10 is a timing diagram illustrating a method of generating an input signal according to another example embodiment of the present invention.

Referring to FIG. 10, the sensing signal S1&TOUCH is generated so that the first switching signal S1 of the first switch 2100 is not distinguishable from the touch signal TOUCH of the touch switch 2400. That is, one type of a signal that is the sensing signal S1&TOUCH is used for the first switching signal S1 and the touch signal TOUCH.

Figure 11:
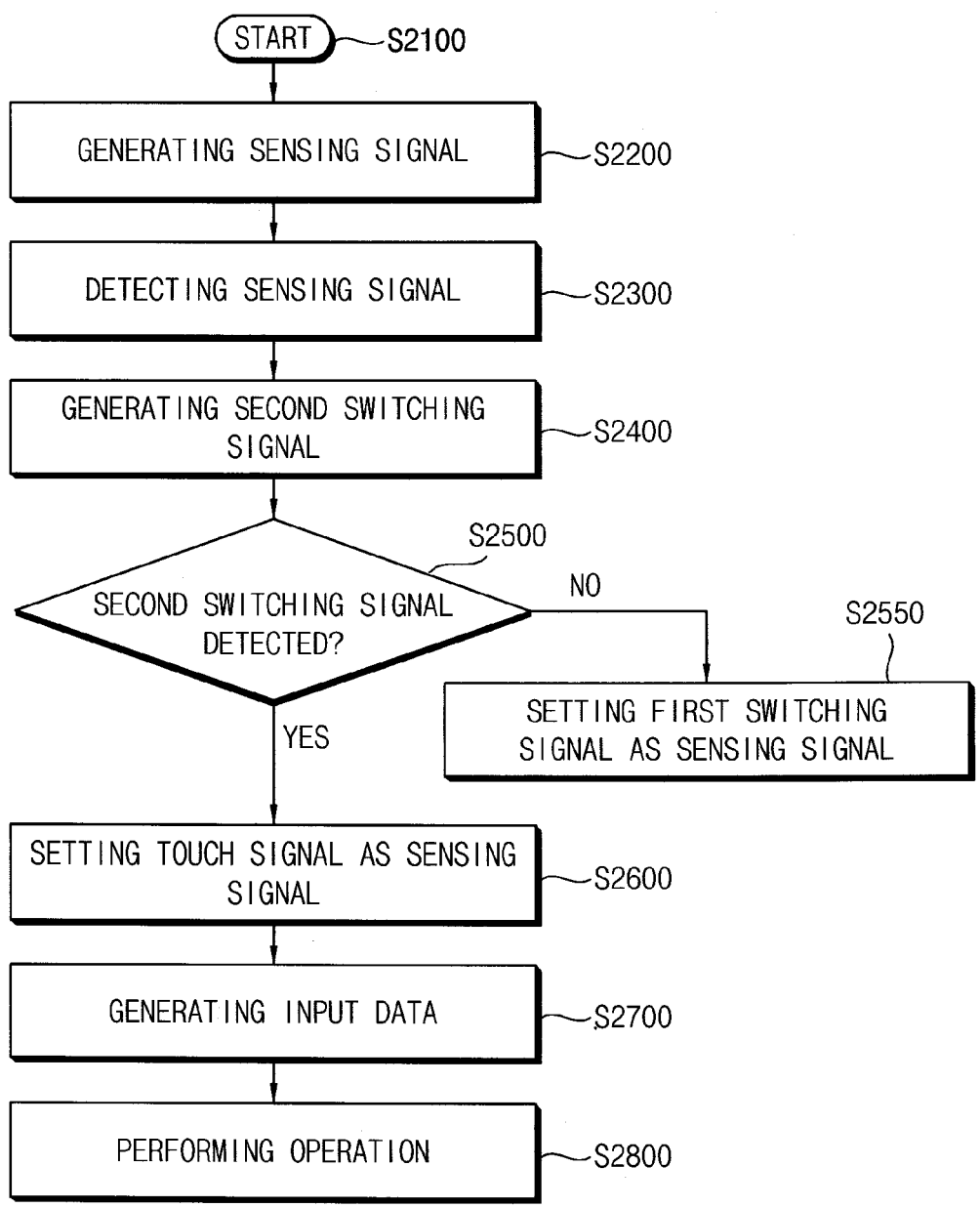
FIG. 11 is a flow chart illustrating a method of generating an input signal according to another example embodiment of the present invention.

FIG. 11 is a flow chart illustrating a method of generating an input signal according to another example embodiment of the present invention.

Referring to FIGS. 8 and 11, in the method of generating the input signal, a flexible display apparatus including a touch part 2450, a second switch 2200 and an input signal generating part 2300 is provided (step S2100). The touch part 2450 is disposed on a display part 2010 to generate a sensing signal S1&TOUCH based on a grip position or a touch. The second switch 2200 is disposed on a corner of the display part 2010 to generate a second switching signal S2 based on the bending of the corner. The input signal generating part 2300 generates an input data IN based on the first and second switching signals S1 and S2.

When fingers of a user grip or touch the flexible display apparatus having the display part 2010, the sensing signal S1&TOUCH is generated using the touch pat 2450 (step S2200).

The sensing signal S1&TOUCH is detected using the input signal generating part 2300 (step S2300).

When the corner of the flexible display apparatus having the display part 2010 is bent by the fingers of the user, the second switching signal S2 is generated using the second switch 2200 (step S2400).

The second switching signal S2 is detected using the input signal generating part 2300 (step S2500).

When the second switching signal S2 is not detected through the input signal generating part 2300, the sensing signal S1&TOUCH is set to be a touch signal TOUCH (step S2550). When the sensing signal S1&TOUCH is set to be the touch signal TOUCH, the input signal generating part 2300 does not perform any further operation. Alternatively, when the sensing signal S1&TOUCH is set to be the touch signal TOUCH, a normal touch operation such as displaying texts, etc., may be performed.

When the second switching signal S2 is detected through the input signal generating part 2300, the sensing signal S1&TOUCH is set to be a first switching signal S1 (step S2600).

The input signal generating part 2300 outputs an input signal corresponding to the first and second switching signals S1 and S2 (step S2700).

An operation corresponding to the input signal IN is performed at the display part 2010.

According to the present example embodiment, one sensing signal S1&TOUCH that is sensed by one touch part 2450 may be used for the first switching signal S1 or the touch signal TOUCH. Thus, the number of elements and manufacturing cost of the flexible display apparatus may be increased.

Figure 12:
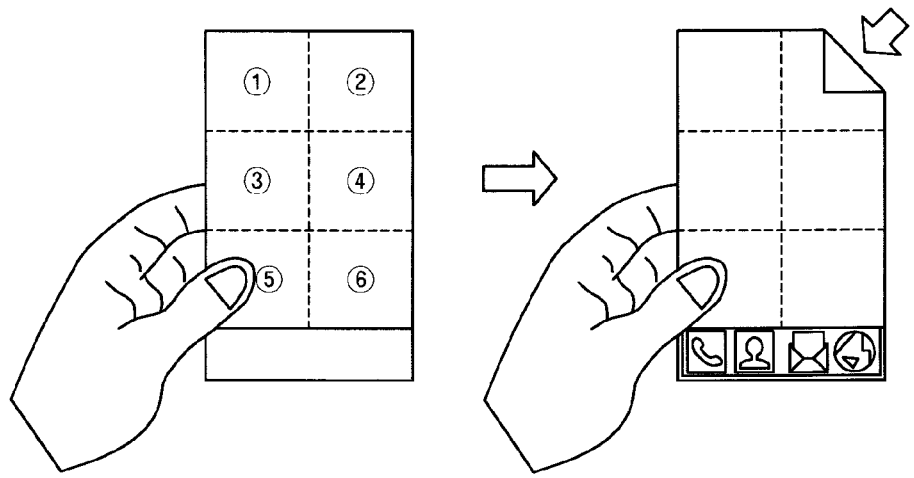
FIG. 12 is a plan view illustrating a method of generating an input signal according to another example embodiment of the present invention.

FIG. 12 is a plan view illustrating a method of generating an input signal according to another example embodiment of the present invention. In the present example embodiment, the flexible display apparatus may include one of the flexible display apparatuses shown in FIGS. 1 to 11.

Referring to FIG. 12, in the method of generating the input signal, the input signal is generated based on one of a plurality of grip positions and a number corresponding to a bending of one of a plurality of corners of the flexible display apparatus. For example, a screen of the flexible display apparatus is divided into six regions ① to ⑥, and the bent corner may be the second corner ②. For example, five different grip positions disposed on the first, third, fourth, fifth or sixth regions ①, ③, ④, ⑤ or ⑥ may be possible.

Table 1 represents a look-up table (LUT) displaying the input signal IN based on the first switching signal S1 corresponding to the grip position and the second switching signal S2 corresponding to the bending.

TABLE 1

| S1 | S2 | IN |
|---|---|---|
| 1 | X | 1 |
|   | O | 2 |
| 3 | X | 3 |
|   | O | 4 |
| 4 | X | 5 |
|   | O | 6 |
| 5 | X | 7 |
|   | O | 8 |
| 6 | X | 9 |
|   | O | 10 |

Referring to Table 1, ten different input signals IN may be generated based on combinations of the first and second switching signals S1 and S2.

For example, the first and second switching signals S1 and S2 are digital signals, so that ten different operations may be possible without input error. For example, when the second switching signal S2 is not detected (X), the input signal may be 1, 3, 5, 7 or 9 so that an auxiliary operation such as luminance control, volume control, etc., may be performed. In this example embodiment, the possible number of the auxiliary operations may be five. Alternatively, for example, when the second switching signal S2 is detected (O), the input signal may be 2, 4, 6, 8 or 10 so that a main operation such as on/off of a program, a mode change, on/off of an application, etc., may be performed. In this embodiment, the possible number of the main operations may be five.

Figure 13:
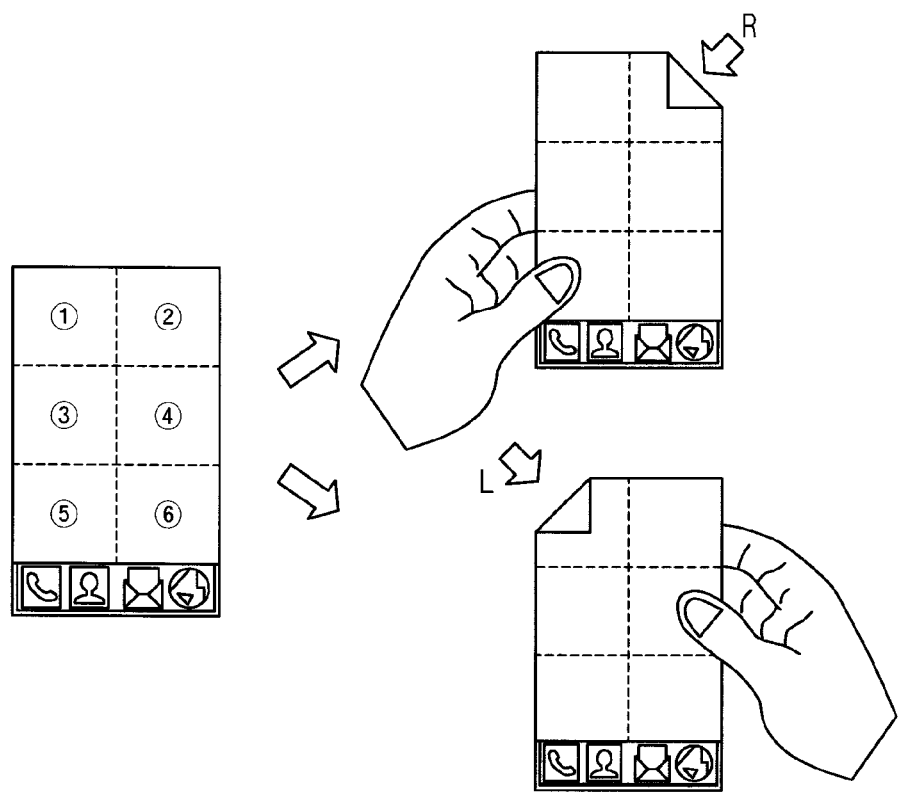
FIG. 13 is a plan view illustrating a method of generating an input signal according to another example embodiment of the present invention.

FIG. 13 is a plan view illustrating a method of generating an input signal according to another example embodiment of the present invention. In this example embodiment, the flexible display apparatus may include one of the flexible display apparatuses shown in FIGS. 1 to 11.

Referring to FIG. 13, in the method of generating the input signal, the input signal is generated based on one of a plurality of grip positions and a number corresponding to one or more bendings of one or more corners of a plurality of corners of the flexible display apparatus. For example, a screen of the flexible display apparatus is divided into six regions ① to ⑥, and the bent corner may be the first corner ① or the second corner ⑥. For example, four different grip positions disposed on the third, fourth, fifth or sixth regions ③, ④, ⑤ or ⑥ may be possible, and also opposite side of the bending corners ② or ① may also be possible for the grip position.

Table 2 represents a look-up table (LUT) displaying the input signal IN based on the first switching signal S1 corresponding to the grip position and the second switching signal S2 corresponding to the bending.

TABLE 2

| S1 | S2 | IN |
|---|---|---|
| 1 | X | 1 |
|   | R | 2 |
| 2 | X | 3 |
|   | L | 4 |
| 3 | X | 5 |
|   | R | 6 |
|   | L | 7 |
| 4 | X | 8 |
|   | R | 9 |
|   | L | 10 |
| 5 | X | 11 |
|   | R | 12 |
|   | L | 13 |
| 6 | X | 14 |
|   | R | 15 |
|   | L | 16 |

Referring to Table 2, sixteen different input signals IN may be generated based on combinations of the first and second switching signals S1 and S2.

For example, the first and second switching signals S1 and S2 are digital signals, so that sixteen different operations may be possible without input error. For example, when the second switching signal S2 is not detected (X), the input signal may be 1, 3, 5, 8, 11 or 14 so that an auxiliary operation such as luminance control, volume control, etc., may be performed. In the present example embodiment, the possible number of the auxiliary operations may be six.

Alternatively, for example, when the second switching signal S2 corresponding to bending of the right corner ② is detected (R), the input signal may be 2, 6, 9, 12 or 15. Also, when the second switching signal S2 corresponding to bending of the left corner ① is detected (L), the input signal may be 4, 7, 10, 13 or 16. For example, when the second switching signal S2 is detected (R or L), the input signal may be 2, 4, 6, 7, 9, 10, 12, 13, 15 or 16 so that a main operation such as on/off of a program, a mode change, on/off of an application, etc., may be performed. In this embodiment, the possible number of the main operations may be ten.

In this example embodiment, the bent corners are disposed in the first and second regions ① and ②. Alternatively, other corners or a central region may also be bent to generate various input signals.

Figure 14:
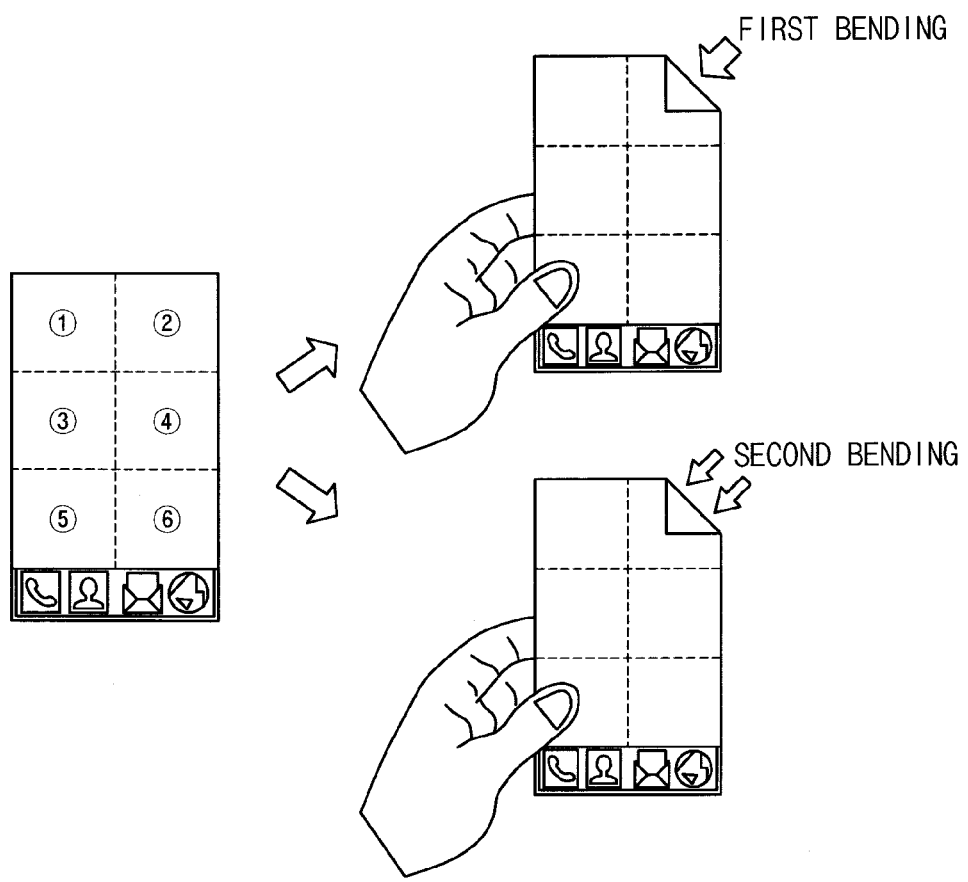
FIG. 14 is a plan view illustrating a method of generating an input signal according to another example embodiment of the present invention.

FIG. 14 is a plan view illustrating a method of generating an input signal according to another example embodiment of the present invention. In the present example embodiment, the flexible display apparatus may include one of the flexible display apparatuses shown in FIGS. 1 to 11.

Referring to FIG. 14, in the method of generating the input signal, the input signal is generated based on one of a plurality of grip positions and a number corresponding to of a number of bending occurrences at one of a plurality of corners of the flexible display apparatus. For example, a screen of the flexible display apparatus is divided into six regions ① to ⑥, and the bent corner may be the second corner ②. For example, five different grip positions disposed on the first, third, fourth, fifth or sixth regions ①, ③, ④, ⑤ or ⑥ may be possible.

Table 3 represents a look-up table (LUT) displaying the input signal IN based on the first switching signal S1 corresponding to the grip position and the second switching signal S2 corresponding to the bending.

TABLE 3

| S1 | S2 | IN |
|---|---|---|
| 1 | X | 1 |
|   | ONCE | 2 |
|   | TWICE | 3 |
| 3 | X | 4 |
|   | ONCE | 5 |
|   | TWICE | 6 |
| 4 | X | 7 |
|   | ONCE | 8 |
|   | TWICE | 9 |
| 5 | X | 10 |
|   | ONCE | 11 |
|   | TWICE | 12 |
| 6 | X | 13 |
|   | ONCE | 14 |
|   | TWICE | 15 |

Referring to Table 3, fifteen different input signals IN may be generated based on combinations of the first and second switching signals S1 and S2.

For example, the first and second switching signals S1 and S2 are digital signals, so that fifteen different operations may be possible without input error. For example, when the second switching signal S2 is not detected (X), the input signal may be 1, 4, 7, 10 or 13 so that an auxiliary operation such as luminance control, volume control, etc., may be performed. In this example embodiment, the possible number of the auxiliary operations may be five. Alternatively, when the second switching signal S2 corresponding to bending of the right corner ② is detected to be once or twice (ONCE or TWICE), the input signal may be 2, 3, 5, 6, 8, 9, 11, 12, 14 or 15 so that a main operation such as on/off of a program, a mode change, on/off of an application, etc., may be performed. In this embodiment, the possible number of the main operations may be ten.

In the example embodiment of FIG. 14, the number of bending occurrences of the corner is once or twice. Alternatively, the number of the bending of the corner may be more than three.

In another example embodiment, the embodiment of FIG. 13 may be combined with the embodiment of FIG. 14, so that the screen of the flexible display apparatus may be divided into six regions ① to ⑥, and the bent corner may be the first corner ① or the second corner ②. Also, the number of bending of each of the first and second corners ① or ② may be once or twice. For example, four different grip positions disposed on the third, fourth, fifth or sixth regions ③, ④, ⑤ or ⑥ may be possible, and also opposite side of the bending corners ② or ① may also be possible for the grip position.

Table 4 represents a look-up table (LUT) displaying the input signal IN based on the first switching signal S1 corresponding to the grip position and the second switching signal S2 corresponding to the bending.

TABLE 4

| S1 | S2 | IN |
|---|---|---|
| 1 | X | 1 |
|  | R-ONCE | 2 |
|  | R-TWICE | 3 |
| 2 | X | 4 |
|  | L- ONCE | 5 |
|  | L- TWICE | 6 |
| 3 | X | 7 |
|  | R- ONCE | 8 |
|  | R- TWICE | 9 |
|  | L- ONCE | 10 |
|  | L- TWICE | 11 |
| 4 | X | 12 |
|  | R- ONCE | 13 |
|  | R- TWICE | 14 |
|  | L- ONCE | 15 |
|  | L- TWICE | 16 |
| 5 | X | 17 |
|  | R- ONCE | 18 |
|  | R- TWICE | 19 |
|  | L- ONCE | 20 |
|  | L- TWICE | 21 |
| 6 | X | 22 |
|  | R- ONCE | 23 |
|  | R- TWICE | 24 |
|  | L- ONCE | 25 |
|  | L- TWICE | 26 |

Referring to Table 4, twenty six different input signals IN may be generated based on combinations of the first and second switching signals S1 and S2.

For example, first and second switching signals S1 and S2 are digital signals, so that twenty six different operations may be possible without input error. For example, when the second switching signal S2 is not detected (X), the input signal may be 1, 4, 7, 12, 17 or 22 so that an auxiliary operation such as luminance control, volume control, etc., may be performed. In this embodiment, the possible number of auxiliary operations may be six.

Alternatively, for example, when the second switching signal S2 corresponding to bending of the right corner ② is detected once or twice (R-ONCE or R-TWICE), the input signal may be 2, 3, 8, 9, 13, 18, 19, 23 or 24. Also, when the second switching signal S2 corresponding to bending of the left corner ① is detected once or twice (L-ONCE or L-TWICE), the input signal may be 5, 6, 10, 11, 15, 16, 20, 21, 25 or 26. When the second switching signal is detected, a main operation such as on/off of a program, a mode change, on/off of an application, etc., may be performed. In this example embodiment, the possible number of the main operations may be twenty.

In the present example embodiments, the main operations and the auxiliary operations are distinguished. However, various combinations of the operations may be possible using the digital first and second switching signals.

According to the examples of the present invention, the switching complex includes the first switch sensing a grip position and a second switch sensing bent or not at a corner of the display part to generate various input signals. Also, error of the switching complex is decreased, and a compensating process may be omitted. In addition, yield of the display apparatus is increased.

Furthermore, the sensing signal generated from one touch part may be used as the first switching signal or the touch signal, so that the number of elements and manufacturing cost of the display apparatus may be decreased.

Various variables such as the presence of a grip, the grip position, the presence of a bend, the bend position, the number of the bending, etc., are combined to generate various digital input signals.

The present inventive concept may be applied to an electric device having an organic light emitting display device. For example, the present inventive concept may be applied to a television, a computer monitor, a laptop, a digital camera, a cellular phone, a smart phone, a personal digital assistant (PDA), a portable multimedia player (PMP), a MP3 player, a navigation system, a video phone, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A switching complex comprising:
   a first switch disposed on a display part including a plurality of divided regions and configured to generate a first switching signal based on a grip position corresponding to one of the divided regions;
   a second switch disposed on a corner of the display part and configured to generate a second switching signal based on a bending position of the corner of the display part and a bending number of the corner of the display part while the first switching signal is being generated; and
   an input data generating part configured to receive the first switching signal and the second switching signal and to generate input data using a look-up table (LUT) in which an input signal corresponding to the grip position, the bending position and the bending number is stored.

2. The switching complex of claim 1, wherein the bent corner and the grip position are alternatingly disposed.

3. The switching complex of claim 1, wherein the first switching signal includes a digital signal.

4. A flexible display apparatus comprising:
   a display part including a plurality of divided regions and configured to display an image and be bent in response to an external force;
   a first switch disposed on the display part and configured to generate a first switching signal based on a grip position corresponding to one of the divided regions;
   a second switch disposed on a corner of the display part and configured to generate a second switching signal based on a bending position of the corner of the display part and a bending number of the corner of the display part;
   an input signal generating part configured to receive the first switching signal and the second switching signal and to generate an input signal using a look-up table (LUT) in which the input signal corresponding to the grip position, the bending position, and the bending number is stored; and a controlling part configured to drive the display part based on the input signal.

5. The flexible display apparatus of claim 4, wherein the second switching signal is generated while the first switching signal is being generated.

6. The flexible display apparatus of claim 4, wherein the bent corner and the grip position are alternatingly disposed.

7. The flexible display apparatus of claim 6, wherein each of the divided regions includes the first switch, and the second signal senses a bending of the corner of the flexible display apparatus.

8. The flexible display apparatus of claim 7, further comprising a plurality of corners, wherein the second signal senses a plurality of bendings of the corners of the flexible display apparatus.

9. The flexible display apparatus of claim 6, wherein the display part includes a plurality of corners, and wherein each of the divided regions includes the first switch, and the second signal senses a bending of the corners of the flexible display apparatus.

10. The flexible display apparatus of claim 9, wherein the second switching signal senses multiple occurrences of the bending of one or more of the corners.

11. The flexible display apparatus of claim 4, wherein the first switching signal includes a digital signal.

12. The flexible display apparatus of claim 4, further comprising an input data generating part that generates input data based on first and second switching signals.

13. The flexible display apparatus of claim 4, further comprising a touch switch generating a touch signal based on a touch of a user.

14. The flexible display apparatus of claim 13, wherein the first switch further comprises a touch member integrally formed with the touch switch.

15. A method of generating an input signal using a flexible display apparatus including a first switch, a second switch and an input signal generating part, the first switch disposed on a display part including a plurality of divided regions and configured to generate a first switching signal based on a grip position corresponding to one of the divided regions, the second switch disposed on a corner of the display part and configured to generate a second switching signal based on a bending position of the corner of the display part and a bending number of the corner of the display part, the input signal generating part configured to receive the first switching signal and the second switching signal and to generate an input signal using a look-up table (LUT) in which the input signal corresponding to the grip position, the bending position, and the bending number is stored, the method comprising:

generating the first switching signal using the first switch when a finger of a user grips the flexible display apparatus;

detecting the first switching signal using the input signal generating part;

generating a second switching signal using the second switch when the corner of the flexible display apparatus is bent;

detecting the second switching signal using the input signal generating part; and generating the input signal corresponding to the first and second switching signals using the input signal generating part, when the second switching signal is detected while the first switching signal is detected.

16. The method of claim 15, wherein generating the second switching signal includes using the second switch when the corner of the flexible display apparatus is bent multiple times.

17. The method of claim 15, wherein generating the second switching signal includes using the second switch when a plurality of corners of the flexible display apparatus are bent.

18. A method of generating an input signal using a flexible display apparatus including a sensing part, a second switch and an input signal generating part, the sensing part disposed on a display part and configured to generate a sensing signal based on a touch of a user, the second switch disposed on a corner of the display part and configured to generate a second switching signal based on a bending position of the corner of the display part and a bending number of the corner of the display part, the input signal generating part configured to receive the sensing signal and the second switching signal and to generate an input signal using a look-up table (LUT) in which the input signal corresponding to a position of the touch, the bending position, and the bending number is stored, the method comprising:

sensing the touch using the sensing part to generate the sensing signal;

detecting the sensing signal using the input signal generating part;

generating a second switching signal using the second switch when the corner of the flexible display apparatus is bent;

detecting the second switching signal using the input signal generating part;

setting the sensing signal as a first switching signal; and generating the input signal corresponding to first and second switching signals using the input signal generating part.

* * * * *